United States Patent [19]

Stiffler et al.

[11] Patent Number: 4,541,094
[45] Date of Patent: Sep. 10, 1985

[54] SELF-CHECKING COMPUTER CIRCUITRY

[75] Inventors: Jack J. Stiffler, Concord; Michael J. Budwey; James M. Nolan, Jr., both of Holliston, all of Mass.

[73] Assignee: Sequoia Systems, Inc., Marlboro, Mass.

[21] Appl. No.: 477,536

[22] Filed: Mar. 21, 1983

[51] Int. Cl.³ ............................................. G06F 11/16
[52] U.S. Cl. ..................................... 371/68; 364/200
[58] Field of Search ................................... 371/67, 68; 364/200 MS File

[56] References Cited

U.S. PATENT DOCUMENTS

| | | | |
|---|---|---|---|
| 3,476,922 | 11/1969 | Yiotis | 371/68 X |
| 4,032,757 | 6/1977 | Eccles | 371/68 X |
| 4,253,144 | 2/1981 | Bellamy et al. | 371/200 |
| 4,358,823 | 11/1982 | McDonald et al. | 371/68 X |
| 4,453,215 | 6/1984 | Reid | 364/200 |

Primary Examiner—Jerry Smith
Assistant Examiner—Mark Ungerman
Attorney, Agent, or Firm—Wolf, Greenfield & Sacks

[57] ABSTRACT

Circuitry for a fault-tolerant computer is disclosed which circuitry is constructed in two identical halves. Each half, by itself, is not a functionally-complete circuit, however, the two identical halves can be connected together to provide a functionally-complete circuit. Each of the two circuit halves is considerably less complex than a functionally-complete circuit yet, when connected together, the two halves provide fault detection capabilities equivalent to a computer system in which the outputs of two functionally-complete, redundant circuits are compared to detect faults.

In particular, each inventive circuit half contains a complete data processing and control unit but only one half of the memory which is necessary for a functionally-complete unit. The processing units on each circuit half operate simultaneously on identical data and the same address information is provided to the memories on each circuit half.

To provide error detection, address information and data sent from each control unit to its associated memory is compared between circuit halves. In addition, information provided to the circuits over an external bus or generated by the control unit is encoded with an error-detecting code.

20 Claims, 2 Drawing Figures

SELF-CHECKING COMPUTER CIRCUITRY

FIELD OF THE INVENTION

This invention relates to error detecting and correcting circuits for use in computers and data processing machines and, in particular, to circuits for fault detection in fault-tolerant computer systems.

BACKGROUND OF THE INVENTION

The electronic circuitry in most modern computers and data processing machines can be organized into three well-defined logical groups or logic modules, each of which performs a specific subfunction in the accomplishment of the computer's overall function of processing data. For example, most computers contain a central processing module, a memory module and an input/output module.

The central processing module in a computer system typically functions to perform the timing and control operations in the computer and the actual data manipulation or computations required. The memory module is used to store initial data and the results of computations generated by the central processing module. Finally the input/output module is used to receive and forward data from the world outside the computer system into the central processing module and the memory module and to transmit to the outside world the results of the computations carried out by the computer system. Each of the three types of logic modules in a typical computer is a microcosm of the computer itself and may, in turn, be broken down into three submodules or units which have functions similar to the functions of the three main computer modules.

For example, a typical central processing module may be broken into three units: the data processing and control unit, the memory unit and the input/output unit.

The data processing and control unit generates the sequence of signals needed to control the module's operation or carries out the actual data computations or calculations. An arithmetic and logic unit in a central processing module is an example of this functional unit. Similarly, the timing and address generator in a memory module is another example of this type of functional unit.

A second functional unit is the memory unit which temporarily stores the data produced by the data processing and control unit. Examples of a memory functional unit are a cache memory in a central processing module, a memory array in a memory module, or data and command buffer memories located in the input/output module.

The third functional unit is an interface unit which connects a module to an information transfer bus which connects the module to other modules or to the outside world. Examples of interface units are data bus drivers in central processing and memory modules and input-/output bus drivers in an input/output module.

In fault-tolerant computers which can tolerate a circuit malfunction or fault without losing data integrity it is necessary to detect faults in all three types of functional units. After detection of a fault, the computer system must respond quickly enough to prevent the computer system from generating erroneous outputs without generating some type of alarm so that an erroneous output is not accepted as accurate. In addition, the computer system must prevent corruption of its internally stored data base caused by faulty inputs or outputs which may be generated by the fault itself so that the computations which were being performed when the fault occurred can be restarted.

Conventional fault detection methods are of two types: error-detecting coding and duplication/comparison. It has long been recognized that error-detecting codes provide an efficient means for monitoring the operability of memory functional units and interface functional units. It is also well-known that error-detecting codes are not practical for monitoring the operability of data processing and control functional units. Accordingly, error-detecting codes have often been used in fault-tolerant computers in environments which require only limited fault detection and monitoring, such as when only minimal fault detection is necessary or when fault detection is desired but only insofar as it can be achieved at a small incremental cost over the basic non fault-tolerant computer cost.

Prior art fault-tolerant computers which have required a high degree of fault tolerance have utilized error-detecting coding for protection of the memory and interface units and a duplication and compare technique for protection of the data processing and control units. Some prior art fault-tolerant computers utilize duplication and compare techniques at the logical module level, but more frequently, such techniques are used at the system output level.

In a conventional duplicate and compare computer configuration used at the logical module level, two identical modules are used, each of which is functionally complete (the unit is capable of performing completed calculations or data manipulations without any additional circuitry). In particular, each of the duplicated modules contains a complete data processing and control unit, a complete memory unit with sufficient memory capacity to service the data processing and control unit and one or more interface units.

During operation, in each of the duplicated modules the data processing and control unit operates solely with its local memory unit over internal address buses and data buses. Fault-detection and monitoring is achieved by dedicating the two identical modules to the same function and comparing the outputs on a continuous or regular basis. In many prior art systems, in order to accomplish the required comparison, the two identical modules are interconnected by external buses. Each of the identical modules accepts inputs from the buses from both its companion module and from the remainder of the computer system. To acheive high reliability the external buses must also be duplicated.

In many prior art arrangements one of the identical modules generates outputs which are normally used by the remainder of the system while the second module generates outputs which are used solely for comparison to the first module's outputs. In other prior art systems the outputs of both modules are used for comparison purposes and by the remainder of the system.

One problem with such a conventional duplicate and compare scheme is that it is wasteful in its utilization of circuitry. In particular, prior art duplicate and compare schemes use twice as much memory as would be required for a comparable non fault-tolerant system. In addition, two external buses must be used for each module pair to obtain the same data throughput as a non fault-tolerant system using only a single bus. In small computer systems this increase in complexitiy may be acceptable; however, in large computer systems the increase in complexity results in a large increase in cost as well as a large increase in the amount of circuitry which, in turn, increases manufacturing costs and the likelihood of circuit failures and replacements.

Accordingly, it is an object of the present invention to simplify fault detection and monitoring circuitry in a computer system.

It is another object of the present invention to provide simplified fault detection circutry which has a fault detection and monitoring capability equivalent to that of conventional duplication and compare techniques.

It is yet another object of the present invention to provide fault detection and monitoring circuitry which can detect all failures resulting from a single circuit component failure.

It is a further object of the present invention to provide a fault-tolerant and self-checking computer circuit which utilizes only the same amount of total memory which would be required in a non fault-tolerant computer system.

It is still another object of the present invention to provide a fault-tolerant and self-checking computer circuit in which external buses need only be the same width and number as required in a non fault-tolerant computer system.

SUMMARY OF THE INVENTION

The foregoing objects are achieved and the foregoing problems are solved in one illustrative embodiment of the invention in which circuitry for a fault-tolerant computer is constructed in two identical halves. Each half, by itself, is not a functionally-complete circuit, however, the two identical halves can be connected together to provide a functionally-complete circuit. In particular, a complete data processing and control unit is located on each of the two identical halves, however, only one half of the total memory needed to service each data processing and control unit is located in each of the two identical halves.

In operation the data processing and control logic in each of the identical units operates on all of the data. One half of the data used by the data processing and control logic in each unit is retrieved from the unit's own memory or over the unit's own external bus interface. The remaining half of the data is retreived from memory located in the companion unit or over the companion unit's external bus and transferred from the companion unit to the unit over a dedicated interunit bus.

Address information produced by the data processing control unit in each unit is provided to each memory half and compared between the identical units by means of additional interunit signal paths.

Similarly, one half of the data information generated by the data processing and logic unit on each of the identical units is provided to the memory or to the external bus interface located in that unit. The remainder of the data information generated by the data processing logic unit is forwarded over an interunit signal path to be compared with the corresponding half of the data information generated by the data processing and control unit located in the companion unit.

Information stored in the memories and information transmitted and received over the external bus is protected by means of error detecting codes. Specifically, the error detecting code is checked when information is received from an external bus and when information is passed to a data processing and control unit. Information generated by a data processing and control unit is encoded before it is sent to a memory or to an external bus.

Since only one half of the total memory required in a prior art duplication and compare arrangement is necessary in the illustrative fault-tolerant system and since the external buses need be only half as wide as they were in the prior art arrangement, the inventive circuitry results in a cost and complexity reduction, the extent of which depends on the width of the external bus and the amount of memory located in the duplicated modules. In addition, one of the duplicated external bus interfaces which are necessary in the conventional duplication and compare scheme can be replaced by interunit signal paths which are one-to-one connections and thus considerably less complex circuitry is necessary.

DETAILED DESCRIPTION OF THE PREFERRED EMBODIMENT

Figure 1:
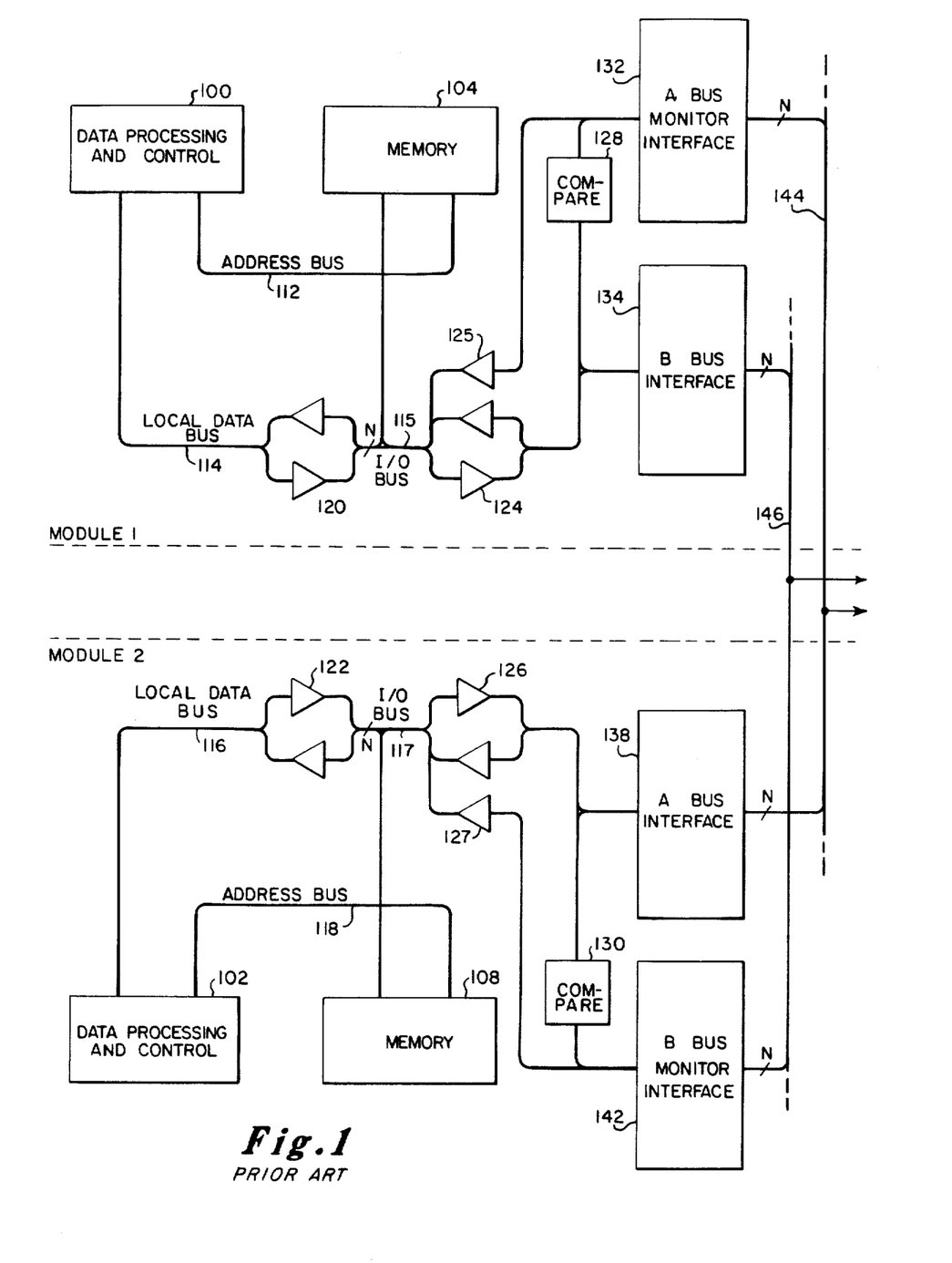
FIG. 1 of the drawing is a block schematic diagram of a conventional prior art duplicate and compare fault detection and monitoring technique.

FIG. 1 is a block schematic diagram of a typical prior art computer logic module using prior art duplication and comparison fault detection techniques. As discussed above this module may illustratively be a data processing and control module, a memory module or an interface module. The logic module consists of two duplicated halves, each of which is a complete functional module in the sense that the module alone can perform all of the functions and tasks required from that module. Each duplicate module is connected to the remainder of the computer system by an external bus. In order to preserve redundancy, the external buses are also duplicated and designated for convenience as as buses "A" and "B" (buses 144 and 146 in FIG. 1). Both modules must be connected to each external bus so that each module operates simultaneously on the same data. The output of each module is compared to its companion module via the external buses.

More specifically, MODULE 1 consists of data processing and control unit 100 which performs data calculations and controls the operation of the module circuitry. Such a unit generally contains clock and sequencing circuitry which is used to control the flow of information between the various module components. The exact nature of the data processing control circuitry will depend on the type of module. For example, in a central processing module, the timing and address circuitry will include an arithmetic logic unit which performs data computations and clock and sequencing circuitry which are used to control the flow of data between the various module units. Alternatively, if the module under consideration is a memory module, the memory timing and address generators would be included in data processing control unit 100. MODULE 2, which is a duplicate of MODULE 1, also contains an identical data processing and control circuit 102. The exact nature of the circuitry contained in blocks 100 and 102 is well-known and does not form part of the invention.

Each of MODULES 1 and 2 also contains a complete memory unit shown as memory unit 104 for MODULE 1 and memory unit 108 for MODULE 2, respectively. As with the data processing and control unit, the actual composition of memory units 104, 108 depends on the type of module which is under consideration. In a central processing module, memory units 104, 108 may correspond to a cache memory. On the other hand, if an input/output port circuit is under consideration, memory units 104, 108 may correspond to data and command buffers. Similarly, in a memory module, the actual memory array would correspond to memory units 104, 108. As with the data processing and control units the exact nature of the circuitry in blocks 104 and 108 is well-known and is not important for an understanding of the invention.

Memory unit 104 receives address information from data processing and control unit 100 via address bus 112. Memory unit 108 similarly receives address information from data processing and control unit 102 via address bus 118. Although buses 112 and 118 are shown as single lines in FIG. 1, in accordance with well-known practice, they actually consist of multiple wire paths which can simultaneously transfer a plurality of signals. The number of wires in the bus constitute the "width" of the bus.

Both MODULE 1 and MODULE 2 are arranged so that they can handle and process data words of "width" N independently of their companion module. Each module is connected by a separate external bus to the remainder of the computer system. For reliability purposes, each module also monitors the information placed on the other module's associated external bus. Specifically, MODULE 1 communicates with "B" bus 146 by means of bus interface 134 which allows transfer of information both from bus 146 to the module and from the module to bus 146. Similarly, MODULE 2 can communicate with "A" bus 144 by means of interface 138.

MODULE 1 can also monitor information generated on "A" bus 144 by MODULE 2 by means of monitor interface 132 which allows information transfer in one direction from bus 144 to MODULE 1. MODULE 2 can also monitor information generated on "B" bus 146 by MODULE 1 by means of monitor interface 142. The circuitry in interfaces 132, 134, 138 and 142 is of well-known construction and will not be discussed further herein.

Data for storage in the memory unit 104 can either be generated by data processing and control unit 100 or may be received from the remainder of the computer system over external "B" bus 146. More specifically, data can be transferred between data processing and control unit 100 and memory unit 104 over local data bus 114, data bus drivers 120 and I/O bus 115. Information on "B" bus 146 can be moved between memory unit 104 and the remainder of the computer system by means of I/O bus drivers 124 and bus interface 134.

Similarly, data passes between data processing and control unit 102 and memory unit 108 via local data bus 116, drivers 122 and I/O bus 117. Interface 138 in MODULE 2 passes information between I/O bus 117 and "A" bus 144 via I/O bus drivers 126.

In order to provide fault detection capability, information on "B" bus 146 generated by MODULE 1 is provided via monitor interface 142 in MODULE 2, to compare circuit 130. Compare circuit 130 also receives an input from drivers 126 and thereby compares the information on I/O bus 117 developed by MODULE 2 with the same information developed by MODULE 1 and forwarded over "B" bus 146. An additional path in MODULE 2 involving driver 127 allows information on "B" bus 146 to be driven into memory 108 or data processing and control unit 102 in order to update information in MODULE 2 to ensure that it runs with the same data as MODULE 1.

Similarly, information on "A" bus 144 generated by MODULE 2 is provided to monitor interface 132 in MODULE 1 and from there to compare circuit 128 which compares the information on "A" bus 144 with information produced by MODULE 1 on I/O bus 115. Information handled by monitor interface 132 can also be provided, via driver 125, to memory 104 or data processing and control unit 100.

The prior art duplicate and compare scheme achieves fault detection and monitoring by comparing the output information generated by both modules and signalling a fault condition if the outputs are not equal. In general it is known that "faults" can be generated in electronic circuitry due to the failure of one or more "components". When used in this context, the term "component" refers to electronic circuitry whose elements are subject to one or more common failure modes. For example, integrated circuits are subject to certain well-known failure modes including "puncture" failures which produce a direct electrical short between the supply voltage and ground. Such a failure disables every component in the circuit and consequently integrated circuits are considered as single "components" in a fault-tolerant context.

It is also known that in the prior art duplicate and compare scheme any single fault in either duplicated module causing the module outputs to differ will be detected unless one of the following conditions in present:

1. The comparator that should have detected the discrepancy has also failed;
2. Both modules have functionally equivalent failures that result, at least momentarily, in identical but erroneous outputs;
3. One module fails in such a way that it generates an output which is unexpected and therefore not monitored by its companion module; or
4. A monitor interface component fails in such a way that it invalidates its inputs while leaving its outputs in their correct states.

The prior art duplicate and compare scheme works reasonably well because faults in the first two of the above categories require multiple component failures and hence are of extremely low probability, particularly if periodic tests are made to ensure that the monitors are functioning properly. Faults in the third category above do not necessarily involve multiple failures, however, it is known that such faults can be easily detected if a limited amount of state information is passed between the two modules and compared.

Faults in the last category above, however, are not low probability events since they could result from single component failures. For example, a short circuit in an inverter might well hold both its input and its output at a logical "0" level. If the failed inverter were in a monitor interface and a correct output to the bus were a logical "1" the input to the comparator would be correct even though the corresponding bit on the bus would have been forced to an incorrect state by the failed comparator. Even though such faults are presumably pattern sensitive (if, in the above example, the correct output were a logical "0" the fault would have been detected) it is generally not acceptable in a fully fault-tolerant system to allow even one correct output to pass undetected and corrupt the data base.

Therefore, in prior art fault-tolerant computers, two methods have been used for detecting faults in this last category. One prior art method (illustrated by FIG. 1) has been to use two external buses with each module generating information on one bus and monitoring the information on the other bus. This approach is effective, if all modules in the computer system operate in this fashion. More particularly, in the previous example, different information would still be sent from one module pair to the other module pair without the discrepancy being detected. However, if the recipient module pair subsequently sent information over the bus based on these non-identical inputs, its bus monitors will presumably detect the discrepancy before the information is actually used and corrupts the data base. This prior art approach suffers from two disadvantages. One is that the latency period between an occurrence of a fault and its detection may be large, therefore, making it potentially difficult to determine the source of the fault and to restore the data base if it has been corrupted. The second problem with this prior art method is that it is extremely inefficient in its use of resources—two complete buses must be used to provide the throughput of one bus in a nonfault-tolerant system.

Another prior art method for coping with faults in the fourth category above is to use error detecting codes in conjunction with certain other error control techniques. The use of these codes is well-known and can provide an efficient detection method for faults in the fourth category. The use of error detecting codes will be discussed in more detail below in connection with the description of the illustrative embodiment of the invention.

Figure 2:
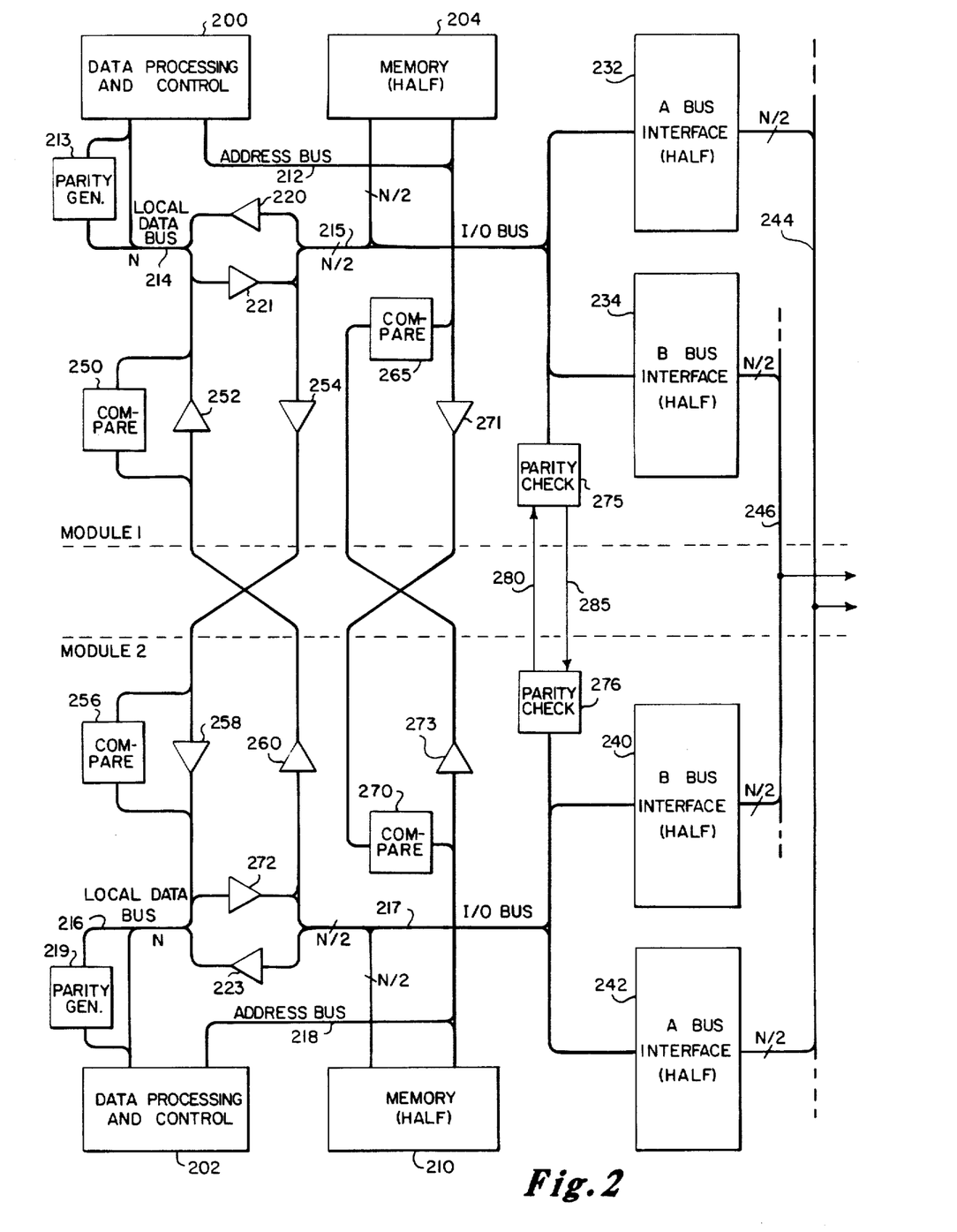
FIG. 2 shows a block schematic diagram of the inventive duplicated unit fault detection and monitoring scheme.

An illustrative embodiment of the invention which achieves fault-tolerant characteristics equivalent to the above-discussed prior art duplicate and compare schemes with a significant decrease in circuit complexity is shown in FIG. 2. The illustrative embodiment of the invention uses two duplicate modules. However, in contrast to the prior art duplicate and compare arrangement, each of the inventive modules is not a complete functional unit. More particularly, MODULE 1 in FIG. 2 consists of data processing and control unit 200, memory 204 and interfaces 232 and 234. Data processing and control unit 200 is a complete data processing and control unit capable of performing control and data manipulations on words of width N. Memory unit 204, however, is only one-half of the memory unit that would be needed to comprise a fully functional module. Specifically, memory half 204 is only capable of storing words of width N/2 (plus parity bits). In addition, internal I/O bus 215 and bus interfaces 232 and 234 are only capable of handling data words of width N/2 (plus parity bits).

MODULE 2, as shown in FIG. 2, is a duplicate of MODULE 1 in that it contains only one-half of the memory and bus interface circuitry that would be necessary for a fully functional module. In addition, "A" and "B" buses 244 and 246, respectively, are only one-half the width of the "A" and "B" buses of the prior art system shown in FIG. 1.

In accordance with one aspect of the invention, MODULEs 1 and 2 shown in FIG. 2 are connected by intermodule bus paths which allow transfer and comparison of both address and data information between the modules to allow the module pair to operate as a complete functional unit with the equivalent fault detection capability of the prior art duplicate and compare scheme while utilizing only one-half of the memory and bus interface circuitry which was necessary in the prior art scheme.

In particular, data processing and control units 200 and 202 operate simultaneously on the same input data and generate the same output data and address information. The address information generated by data processing and control unit 200 is provided over address bus 212 to half memory 204 to access information stored therein. In the process of accessing information in memory 204, data processing and control unit 200 also enables driver 271 so that the address information on bus 212 is transferred, via driver 271, to one input of compare circuit 270. Address information on address bus 212 is also provided to one input of compare circuit 265.

Simultaneously, data processing and control unit 202 provides address information on bus 218 to memory half 210. This address information is also provided to the remaining input of compare circuit 270 and is thereby compared to the address information produced by data processing and control unit 200. In addition, data processing and control unit 202 enables driver 273 to provide its address information to compare circuit 265 so that a double comparison is provided by compare circuits 265 and 270 simultaneously. Since the address information is compared on each of the two identical modules, a failure in a buffer at the input to an address comparator, for example, or a failure in the comparator itself that causes an address to be modified without causing a miscompare on one module cannot also prevent a miscompare on the companion module. This is because all signals monitored on one comparator pass through a driver before being monitored by the second comparator.

A similar comparison is performed on data generated by data processing and control units 200 and 202. More particularly, although MODULE 1 and MODULE 2 are identical they are each assigned a special designation by the computer system—each module will be designated as an "I" module or a "J" module. This designation can be carried out by system software or by hardware. For example, each module may have conventional circuitry therein which senses a prewired voltage on a pin in the interconnecting socket which connectes the module to the remainder of the circuitry. The designation of a particular module will therefore depend on the location of the socket into which it is inserted. The designations are used to determine the data flow paths within the module. The data itself can be broken up into two pieces—one piece that is stored in the "I" module (the "I" information half) and another piece which is stored in the "J" module (the "J" half).

Specifically, when data processing and control unit 200 desires to send information to memory 204 or to the external bus by interfaces 232 and 234, it enables drivers 221 and 254. All of the information generated by data processing control unit 200 (data words of width N) passes to local data bus 214 but the information on bus 214 is split so that only one half of the information passes, via driver 221, to I/O bus 215 (designated for convenience as the information stored by the "I" module or the "I" information half). This "I" information is provided, via enabled driver 254, to one input of comparator 256. Comparator 256 compares the "I" information that is forwarded to the I/O bus 215 to corresponding "I" information generated by data processing and control unit 202 which information is provided from local data bus 216 to the other input of comparator 256.

In accordance with the illustrative embodiment, data processing and control unit 202 simultaneously produces exactly the same data as data processing and control unit 200 and operates in a similar manner to MODULE 1 except that it prepares to transfer the "J" half of this information to memory half 210 or the external buses in a transfer operation corresponding to the transfer operation being undertaken by data processing and control unit 200. During this transfer operation, data processing and control unit 202 enables drivers 272 and 260. The "J" half of the information generated by data processing and control unit 202 is thereby transferred, via driver 272, to I/O bus 217. The same "J" information is provided, via driver 260, to the remaining input of comparator 250 where it is compared with the corresponding "J" half of the data generated by data processing and control unit 200 and provided via bus 214.

When information is to be transferred from the I/O bus 215 (generated either by memory half 204 or obtained from the bus interfaces 232 or 234) to data processing and control unit 200, unit 200 enables the drivers 220, 252 and 254. Simultaneously, data processing and control unit 202 enables drivers 223, 258 and 260. The "I" data present on I/O bus 215 is provided, via enabled driver 220, to local data bus 214 and from there to data processing and control unit 200. The remaining "J" half of the information which makes up the full (N width) data word on local data bus 214 is provided from I/O bus 217. Specifically, "J" information which is on I/O bus 217 is provided, via enabled drivers 260 and 252, to local data bus 214 and from there to data processing and control unit 200. In a similar fashion, data processing and control unit 202 receives the "J" half of its incoming information from I/O bus 217, via driver 223, and the "I" half of its incoming information from I/O bus 215, via drivers 254 and 258.

Comparators 250 and 256 each monitor only one half (the "I" and "J" halves, respectively) of the data so that they are not protected by duplication in the same way as address information comparators 265 and 270. However, in accordance with the invention, all local data sent to a comparator is also first encoded with an error-detecting code. In particular, information generated by data processing and control unit 200 and provided to local data bus 214 is encoded by a parity generator/checker 213. Parity generator/checker 213 may be any well-known parity generating or error-correcting code generating and checking circuitry which is fully described in prior art literature.

Similarly, information provided from the external buses via bus interfaces 232 and 234 is checked for proper reception by parity check circuit 275 before being provided to I/O bus 215. Parity check circuit 275 comprises any of various well-known checking circuits which are capable of checking parity of an error detecting code. Some well-known error check circuits are also able to correct single or multiple errors. Also, information provided to local data bus 214 is also checked by parity generator/checker 213 before it is transferred to data processing and control unit 200.

With proper selection of an error-detecting code and implementation of the coding and decoding circuits, as will be discussed in detail below, no single component failure can modify data on local data bus 214 of I/O bus 215 without also violating the code. Therefore, erroneous data will either result in a miscompare in compare circuit 250 due to local data bus errors or a code violation which is detected by parity check circuits 213 and 275 due to local data bus or I/O bus errors.

To be effective, the error-detecting code used with the illustrative embodiment of the invention must be able to detect all errors produced by any failure in any component. Such failures fall into one of three categories:

1. Failures that produce a desired output but with one or more erroneous bits. For example, during a memory access operation, the memory unit may correctly access the addressed memory location, but circuit faults may have corrupted the information in that location or, even if the stored information is correct, it may not be read properly due to circuit failures;
2. Failures that produce the wrong output. For example, during a memory access operation, memory address failures or output register clock failures may cause the memory unit to access an incorrect location which contains properly stored data; and
3. Failures that result in no output at all (failures that prevent the output of drivers from being enabled).

There are many well known error-detecting coding techniques that when properly implemented are capable of detecting all three classes of errors. Byte parity codes, for example (that is codes consisting of a single even or odd parity bit appended to each data byte) are adequate for this purpose if some care is taken in implementing the coding and decoding circuitry as follows: (1) the I/O bus, memory and bus interfaces must be partitioned so that no two bits, including the parity bit, belonging to the same byte pass through the same component; (2) the pattern of even and odd parity bits changes, in accordance with a prescribed protocol, so that no two successive outputs can have identical bit patterns; and (3) the pattern of even and odd parity bits is such that neither an all "0"s word or an all "1"s word has valid parity (this condition implies that each data word consists of at least two bytes).

The above constraints can be met using conventional technology in a straightforward manner. With the aforementioned constraints, no single component failure can produce an undetected error when a byte parity code is used. In particular, condition (1) above ensures that no single component failure can change more than one bit in any byte. Condition (2) above ensures that repeated outputs produce illegitimate parity patterns. An illegitimate parity pattern combined with the previously-described address and local data bus information comparitors (265, 270 and 250, 256, respectively) guarantee that either a miscompare or a code violation will occur unless a desired output is generated and clocked into the output register. The final condition (3) above ensures that the output enable failures also produce illegitimate parity patterns since the normal quiescent state for an undriven bus is either the all "0"s or the all "1"s state. Conditions (2) and (3) above can be eliminated if the appropriate control signals can be adequately monitored (for example by comparison with similar signals received from the other circuit half) thereby allowing missing register strobes and output enables to be detected directly.

Even with an error-detecting code properly implemented as described above it is possible for two or more component failures to result in an undetectable error.

For example, two I/O bus driver failures could cause an even number of bits in each byte to be altered, thereby, leaving all parity relationships still satisfied. However, this situation is entirely analogous to compensating failures in the two halves of a normal prior art duplicate and compare scheme and correspondingly has a low probability of occurrence.

As with MODULE 1 shown in FIG. 2, MODULE 2 has the same safeguards. More particularly, data information generated by data processing and control unit 202 is encoded by parity generator/checker 219 before being placed on local data bus 216. Similarly, information coming in from bus interfaces 240 and 242 is checked by parity check circuits 276 and 219. It should be noted that since each parity check circuit 275 and 276 checks only one half of a data word, information must be passed between parity check circuits 275 and 276 via buses 280 and 285 to ensure that both halves of each data word simultaneously pass a parity check.

The differences in the illustrative embodiment of the invention as shown in FIG. 2 and the prior art circuit as shown in FIG. 1 are (1) only one-half the total memory is implemented on each MODULE; (2) the internal I/O bus need only be half as wide as the prior art circuitry; (3) the monitor bus interface is replaced by intermodule signal paths over which local data bus and address information can be passed; and (4) information is protected in memory, over the internal I/O bus and through the bus interfaces by error-detecting codes rather than by duplication.

The first two of the above differences obviously result in cost and complexity reductions, the extent of which depend both on the width of the I/O bus and the amount of memory in the system. The third difference also reduces complexity since the intermodule paths are one-to-one and require considerably less circuitry than an interface to a multi-user external bus. The fourth difference adds some complexity, but since the comparators have simply been relocated, this increase is mostly due to the addition of parity generators and checkers. Since these are relatively simple circuits this increase is generally minor. In addition, if the protection offered by the error-detecting code is to be extended to the external bus as is most often the case with high-reliability systems, these parity generators and checkers are already required. There is thus a net reduction in complexity and consequent circuit cost.

Although only one illustrative embodiment of the invention has been disclosed, other modifications and changes will be obvious to those skilled in the art which modifications and changes are intended to be covered by the claims therein.

What is claimed is:

1. Circuitry for a fault-tolerant computer system comprising,
two identical circuit halves, each of said circuit halves in turn comprising,
a data processing and control unit capable of generating timing, addressing and control signals and generating and receiving data words of width N;
a memory unit capable of storing data words of width less than N, said memory being responsive to said address signals for retrieving or storing data words therein;
first means responsive to said control signals for transferring a portion of width less than N of said data words of width N between said data processing and control unit and said memory;
second means responsive to said control signals for transferring data words of width less than N between said data processing and control unit and the memory in the other circuit half;
interface means for connecting said circuit half to said computer system, said interface means being capable of handling data words of width less than N and being responsive to said control signals for passing data words of width less than N between said computer system and said first transferring means; and
means for comparing address information and data generated by said data processing and control unit with address information and data generated by the data processing and control unit in the other circuit half.

2. Circuitry for a fault-tolerant computer system in accordance with claim 1 further comprising means responsive to data words generated by said data processing and control means for encoding said data words generated by said data processing and control means with an error-detecting code.

3. Circuitry for a fault-tolerant computer system according to claim 1 wherein said comparing means further comprises driver means located on each circuit half and responsive to address information generated by the data processing and control unit on that circuit half for transferring said information to the other circuit half and means located on each of said circuit halves for comparing address information generated by the data processing and control unit on that circuit half with address information received from the driver means located on the other circuit half.

4. Circuitry for a fault-tolerant computer system according to claim 1 further comprising means responsive to incoming information passing through said interface means for checking said error detecting code associated with said incoming information to insure proper reception of said information.

5. Circuitry for a fault-tolerant computer system according to claim 1 wherein each of said circuit halves further comprises an I/O bus connecting said data processing and control unit, said memory unit and said interface means, and said comparing means further comprises means for forwarding a portion of the data information generated by said data processing and control unit to said I/O bus, driver means for forwarding said portion of said data information to the other circuit half, and means for comparing the remainder of said data information generated by said data processing and control means to said data information received form said other circuit half.

6. Circuitry for a fault-tolerant computer system according to claim 5 further comprising means for forwarding data information received on said I/O bus to said data processing and control unit and means for forwarding said information on said I/O bus to the data processing and control unit on the other circuit half.

7. Circuitry for a fault-tolerant computer system comprising,
two identical circuit halves, each of said circuit halves in turn comprising,
a data processing and control unit capable of generating timing, addressing and control signals and generating and receiving data words of width N;
a memory unit capable of storing data words of width less than N, said memory being responsive to said address signals for retrieving or storing data words therein;

first means responsive to said control signals for transferring a portion of width less than N of said data words of width N between said data processing and control unit and said memory;

second means responsive to said control signals for transferring data words of width less than N between said data processing and control unit and the memory in the other circuit half;

interface means for connecting said circuit half to said computer system, said interface means being capable of handling data words of width less than N and being responsive to said control signals for passing data words of width less than N between said computer system and said first transferring means;

means for comparing address information and data generated by said data processing and control unit with address information and data generated by the data processing and control unit in the other circuit half;

means responsive to data words generated by said data processing and control means for encoding said data words generated by said data processing and control means with an error-detecting code; and means responsive to incoming information passing through said interface means for checking said error detecting code associated with said incoming information to insure proper reception of said information.

8. Circuitry for a fault-tolerant computer system according to claim 7 wherein said comparing means further comprises driver means located on each circuit half and responsive to address information generated by the data processing and control unit on that circuit half for transferring said information to the other circuit half and means located on each of said circuit halves for comparing address information generated by the data processing and control unit on that circuit half with address information received from the driver means located on the other circuit half.

9. Circuitry for a fault-tolerant computer system according to claim 7 wherein each of said circuit halves further comprises an I/O bus connecting said data processing and control unit, said memory unit and said interface means, and said comparing means further comprises means for forwarding a portion of the data information generated by said data processing and control unit to said I/O bus, driver means for forwarding said portion of said data information to the other circuit half, and means for comparing the remainder of said data information generated by said data processing and control means to said data information received form said other circuit half.

10. Circuitry for a fault-tolerant computer system according to claim 9 wherein said checking means further comprises means for generating a parity check signal when said error detecting code associated with an incoming data word indicates the proper reception of said incoming data word and means responsive to the parity check signal generated by the parity check signal generating means in the checking means located in one circuit half and responsive to the parity check signal generated by the parity check signal generating means in the checking means located in the other circuit half for indicating when incoming data words have been substantially simultaneously received by both checking means.

11. A circuit element for use in a fault-tolerant computer system comprising, a first circuit half, comprising, a first data processing and control unit capable of generating first timing, addressing and control signals and generating and receiving data words, said data words being comprised of a first data portion and a second data portion;

a first memory unit responsive to said first timing, addressing and control signals for storing said first data portion; and a first interface responsive to said first timing, addressing and control signals for transferring said first data portion between said first circuit half and said computer system;

a second circuit half, comprising, a second data processing and control unit capable of generating second timing, addressing and control signals and generating and receiving said data words;

a second memory unit responsive to said second timing, addressing and control signals for storing said second data portion;

a second interface responsive to said second timing, addressing and control signals for transferring said second data portion between said second circuit half and said computer system; and an address comparator means for comparing said first addressing signals with said second addressing signals.

12. A circuit element according to claim 11 wherein said first circuit half further comprises another address comparator means for comparing said first addressing signals with said second addressing signals.

13. A circuit element according to claim 12 wherein said first circuit half further comprises a first data comparator means for comparing said first data portion of data words generated by said first data processing and control unit with said first data portion of data words generated by said second data processing and control unit.

14. A circuit element according to claim 13 wherein said second circuit half further comprises a second data comparator means for comparing said second data portion of data words generated by said second data processing and control unit with said second data portion of data words generated by said first data processing and control unit.

15. A circuit element according to claim 14 wherein said first circuit half further comprises means responsive to said data words for encoding said information with an error-detecting code and said second circuit half further comprises means responsive to said data words for encoding said information with an error-detecting code.

16. A circuit element according to claim 15 wherein said first circuit half further comprises means responsive to said first data portion passing through said first interface for checking said error detecting code associated with said first data portion to insure proper reception of said information and said second circuit half further comprises means responsive to said second data portion passing through said second interface for checking said error detecting code associated with said incoming information to insure proper reception of said second data portion.

17. A circuit element according to claim 16 wherein said first circuit half further comprises first means responsive to control signals generated by said first data processing and control unit for forwarding said first data portion received from said computer system through said first interface to said second data processing and control unit.

18. A circuit element according to claim 17 wherein said second circuit half further comprises second means responsive to control signals generated by said second data processing and control unit for forwarding said second data portion received from said computer system through said second interface to said first data processing and control unit.

19. A circuit element according to claim 18 wherein said first circuit half further comprises first means for connecting said first interface to a first I/O bus in order to connect said first circuit half to said computer system and said second circuit half further comprises second means for connecting said second interface to a second I/O bus in order to connect said second circuit half to said computer system.

20. A circuit element according to claim 19 wherein said first circuit half further comprises first means for connecting said first interface to said second I/O bus in order to connect said first circuit half to said computer system and said second circuit half further comprises second means for connecting said second interface to said first I/O bus in order to connect said second circuit half to said computer system.

* * * * *